US012684087B1

(12) United States Patent
Chen et al.

(10) Patent No.: US 12,684,087 B1
(45) Date of Patent: Jul. 14, 2026

(54) AUDIO DATASETS GENERATION FOR VIDEOCONFERENCING

(71) Applicant: Zoom Video Communications, Inc., San Jose, CA (US)

(72) Inventors: Yuhui Chen, San Jose, CA (US); Qiang Gao, Charlotte, NC (US); Zhaofeng Jia, Saratoga, CA (US); Xian Tong, Hangzhou (CN); Ye Wang, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 194 days.

(21) Appl. No.: 18/406,804

(22) Filed: Jan. 8, 2024

(51) Int. Cl.
H04N 7/14 (2006.01)
H04N 7/15 (2006.01)

(52) U.S. Cl.
CPC ............. H04N 7/147 (2013.01); H04N 7/152 (2013.01); H04N 7/155 (2013.01); H04N 7/157 (2013.01)

(58) Field of Classification Search
CPC combination set(s) only.
See application file for complete search history.

(56) References Cited

U.S. PATENT DOCUMENTS

| | | | |
|---|---|---|---|
| 2011/0316768 A1* | 12/2011 | McRae | ................... G06F 3/165 |
| | | | 381/80 |
| 2020/0152207 A1* | 5/2020 | Wang | ....................... G10L 17/04 |
| 2021/0361227 A1* | 11/2021 | Chou | ....................... G10L 25/66 |
| 2023/0087854 A1* | 3/2023 | Yu | ......................... G06F 3/0481 |
| | | | 367/117 |
| 2024/0087593 A1* | 3/2024 | Sharma | .................. G06Q 10/04 |
| 2024/0406622 A1* | 12/2024 | Fernandez | .............. G10L 25/30 |
| 2025/0211704 A1* | 6/2025 | Villavicencio | ......... H04N 5/272 |

* cited by examiner

*Primary Examiner* — Stella L. Woo

(74) *Attorney, Agent, or Firm* — Kilpatrick Townsend & Stockton LLP

(57) ABSTRACT

Systems and methods for active speaker detection for videoconferencing are provided. For example, an audio recording system can record a set of raw audio signals. The set of raw audio signals include audio signals recorded by a set of microphones at different distances from an audio source with different orientations. An audio dataset generation system can access a virtual meeting room setup which specifies microphones used in a virtual meeting room, locations of speakers and the microphones, and orientations of the speakers. The audio dataset generation system generates a synthetic audio signal for each of the speakers specified in the virtual meeting room setup by combining audio signals selected from the set of raw audio signals according to the virtual meeting room setup.

20 Claims, 10 Drawing Sheets

300

600

LOAD CONFIGURATION FILE AND SOURCE AUDIO FILES
610

RECORD AUDIO SIGNALS FOR EACH SOURCE AUDIO FILE  612

START RECORDING ON SELECTED MICROPHONES
614

START PLAYING THE SOURCE AUDIO FILE ON THE
AUDIO SOURCE DEVICE  616

STOP RECORDING AND SAVE RECORDED AUDIO
SIGNALS WHEN THE PLAYING IS OVER  618

CHANGE DISTANCE OR ORIENTATION BETWEEN
AUDIO SOURCE DEVICE AND MICROPHONES  620

END

VIRTUAL MEETING ROOM SETUP 702

|  | SPEAKER A | SPEAKER B | SPEAKER C |
|---|---|---|---|
| MIC 1 | $(m_1, d_{A\_1}, \alpha_{A\_1})$ | $(m_1, d_{B\_1}, \alpha_{B\_1})$ | $(m_1, d_{C\_1}, \alpha_{C\_1})$ |
| MIC 2 | $(m_2, d_{A\_2}, \alpha_{A\_2})$ | $(m_2, d_{B\_2}, \alpha_{B\_2})$ | $(m_2, d_{C\_2}, \alpha_{C\_2})$ |
| MIC 3 | $(m_3, d_{A\_3}, \alpha_{A\_3})$ | $(m_3, d_{B\_3}, \alpha_{B\_3})$ | $(m_3, d_{C\_3}, \alpha_{C\_3})$ |
| MIC 4 | $(m_4, d_{A\_4}, \alpha_{A\_4})$ | $(m_4, d_{B\_4}, \alpha_{B\_4})$ | $(m_4, d_{C\_4}, \alpha_{C\_4})$ |

SCENARIO MATRIX 704

900

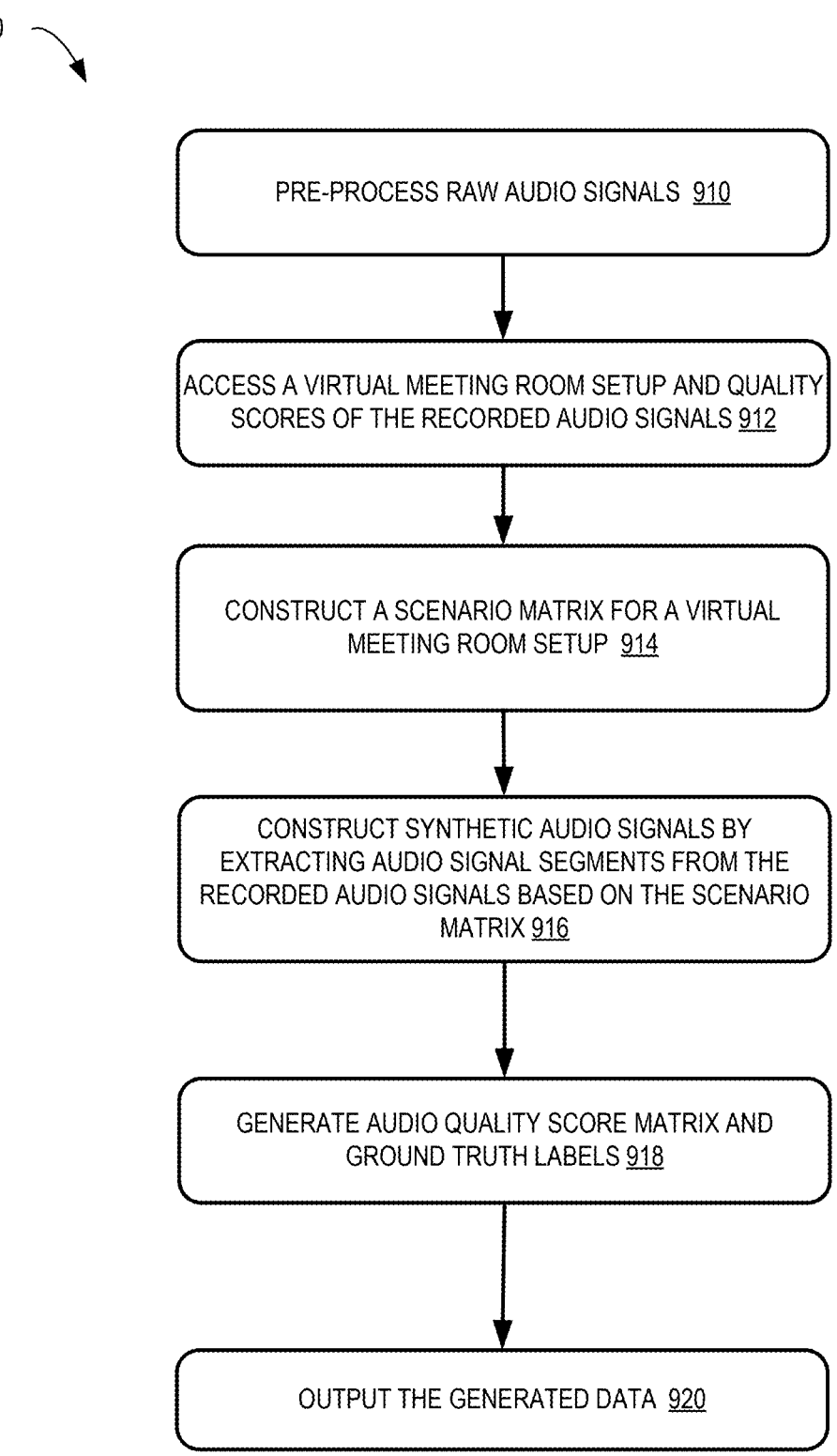

PRE-PROCESS RAW AUDIO SIGNALS 910

ACCESS A VIRTUAL MEETING ROOM SETUP AND QUALITY SCORES OF THE RECORDED AUDIO SIGNALS 912

CONSTRUCT A SCENARIO MATRIX FOR A VIRTUAL MEETING ROOM SETUP 914

CONSTRUCT SYNTHETIC AUDIO SIGNALS BY EXTRACTING AUDIO SIGNAL SEGMENTS FROM THE RECORDED AUDIO SIGNALS BASED ON THE SCENARIO MATRIX 916

GENERATE AUDIO QUALITY SCORE MATRIX AND GROUND TRUTH LABELS 918

OUTPUT THE GENERATED DATA 920

*FIG. 9*

AUDIO DATASETS GENERATION FOR VIDEOCONFERENCING

FIELD

The present application generally relates to videoconferencing, and more particularly relates to intelligent audio datasets generation for videoconferencing.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 9 shows a flowchart depicting a process for generating synthetic audio datasets, according to certain aspects of the present disclosure.

DETAILED DESCRIPTION

Figure 1:
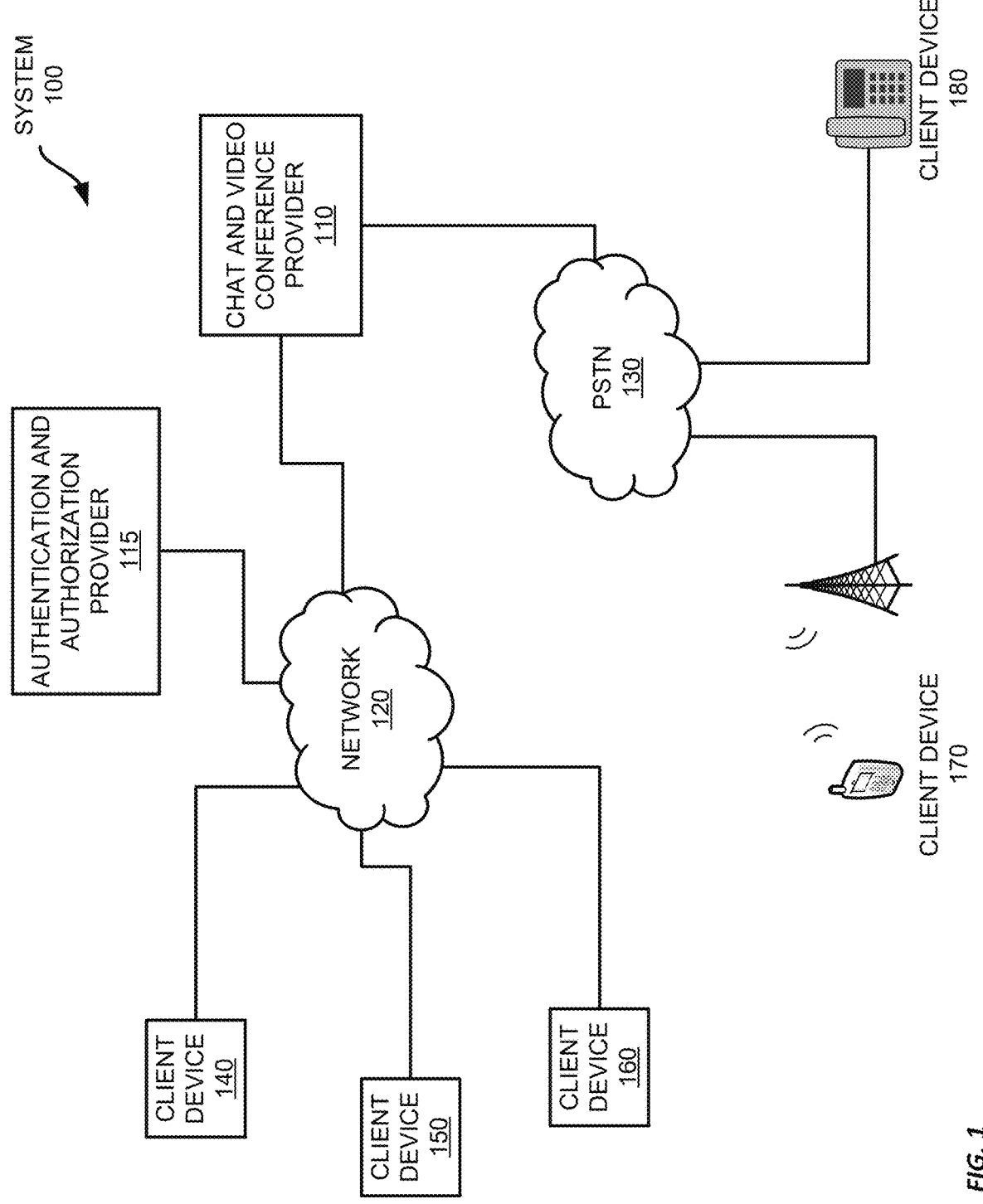
FIG. 1 shows an example system that provides videoconferencing functionality to various client devices, according to certain aspects described herein.

Examples are described herein in the context of systems and methods for audio datasets generation for videoconferencing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

In the video-conferencing platform, audio signals generated during the video conference can be processed for various purposes. For example, audio signals from each participant need to be delivered to other participants in high quality. As such, audio signals captured at the client computing devices of the individual participants can be processed to, for example, remove noises, reverberations, and so on. In addition, active speaker indication can be helpful during the video conferences to help the conference participants to locate the speaker, thereby improving the efficiency of the video conference. Generating transcripts for the video conference can also facilitate the participants of the conference to improve the understanding of the content of the video conference. Generating a summary of the video conference can allow users who did not attend the video conference to quickly catch up with the discussion of the meeting.

The algorithms or models used to process the audio signals, generate the transcript and summary need to be trained and tested to ensure the performance thereof. However, generating the audio datasets for training and testing usually involves recording people speaking in a real scene using multiple microphones in a typical meeting room with different configurations, such as different speaker-microphone distances, orientations, and so on. This is a time-consuming process and often leads to recorded audio signals containing unwanted noises if the recording is not performed at a proper time (e.g., during work hours). In addition, the quality of the recorded files is generally insufficient because it is hard to guarantee that the speaker uses the same speed, volume, and tone during the recording and keeps the same orientation from the microphones. This requires computationally expensive post-processing to process the recorded audio files to generate the training or testing datasets which may still contain inaccuracy or inconsistency. As a result, the generated audio datasets are limited in terms of quantity and quality, leading to inaccurate audio processing models or algorithms.

To solve the above problems, example systems and methods for intelligent audio datasets generation for videoconferencing are provided. As described herein, an audio recording system can be set up to record raw audio signals and an audio dataset generation system can generate synthetic audio signals based on virtual meeting room setups by combining segments of audio signals from the recorded raw audio signals.

For example, the audio recording system includes a set of microphones arranged in a close distance to each other (e.g., no more than 1 meter away). The set of microphones can include different types of microphones that may be used during the video conference, such as a laptop microphone, a standalone microphone, a conference microphone, a table microphone, a ceiling microphone, a microphone array, and so on. The audio recording system further includes an audio source device, such as a head speaker that can simulate the human vocal characteristic. The audio source device can be installed on a robot or another movable machine that can move to different distances and orientations.

In some examples, the microphones, the audio source device, and the robot are controlled by a control computing device. To record audio signals, the control computing device can access a set of source audio files, each file containing a source audio signal of human speeches or conversations (for generating speech dataset) or noise (for generating noise dataset). Each source audio signal contains multiple segments with each segment corresponding to one sentence. For each source audio file, the control computing device turns on the microphones and plays the source audio file on the audio source device at a given distance and orientation with respect to the microphones. Once the play of the source audio file is over, the control computing device stores the recorded raw audio signals as individual files, one for each microphone.

The control computing device can then move the robot to a different orientation from the microphones and repeat the above process until the set of source audio files have been recorded at the given distance for all the orientations. The control computing device can move the robot to a different distance and repeat the above process again. As a result, the source audio file can be recorded by the microphones at different distances and orientations from the audio source device. Each of the recorded files can be stored for later use.

The audio dataset generation system can generate a synthetic audio dataset for a given virtual meeting room setup. For example, the virtual meeting room setup can specify the number of microphones and their respective types and locations within the virtual meeting room. Likewise, the virtual meeting room setup can also specify the number of speakers and their respective locations and orientations. Based on the virtual meeting room setup, the audio dataset generation system can determine a scenario matrix to describe the relationship between each microphone and each speaker, including their distance and the orientation of the speaker with respect to the microphone. The scenario matrix can further specify the type of each microphone.

Based on the scenario matrix, the audio dataset generation system can extract audio segments from the recorded raw audio signals. For example, for each microphone, the audio dataset generation system can identify a recorded audio file recorded by the same type of microphone at a similar distance and orientation from the audio source device as the microphone and a first speaker in the virtual meeting room setup. Likewise, the audio dataset generation system can identify another recorded audio file recorded by the same type of microphone at a similar distance and orientation from the audio source device as the microphone and a second speaker in the virtual meeting room setup. This can be repeated for other speakers in the virtual meeting room setup. The audio dataset generation system further extracts a segment from each of the identified audio files and concatenates the extracted segments to generate a synthetic audio signal for the microphone. In some examples, to avoid audio discontinuity or clipping in the concatenated signal, a smoothing process such as fade-in or fade-out smoothing is applied during the concatenation. The above process can be repeated for other microphones in the virtual meeting room setup to generate respective synthetic audio signals. In this way, the audio dataset generation system can generate synthetic audio signals for different virtual meeting room setups. In addition to the synthetic audio signals, the audio dataset generation system can further generate an active speaker label for each synthetic audio signal indicating the active speaker of each segment in the synthetic audio signal.

In some examples, the audio dataset generation system can process the raw audio signals before extracting segments therefrom. For example, the audio dataset generation system can remove the silent portions in the raw audio signals and align the raw audio signals. The audio dataset generation system can also determine the quality of raw audio signals, for example, by generating a quality score for each raw audio signal or each segment of each raw audio signal. If the quality scores are available, the audio dataset generation system can generate a score matrix indicating the quality of the audio signal from a specific speaker as recorded by a particular microphone. The audio dataset generation system can further generate ground truth labels identifying the highest-quality microphone for each speaker.

The synthetic audio signals, the active speaker labels, and the ground truth labels can be output to an audio data processing system as the synthetic audio datasets. The audio data processing system can train, test, or evaluate audio processing machine learning models or algorithms used in, for example, sound event detection (SED), automatic speech recognition (ASR), denoising, acoustic echo cancellation (AEC), automatic gain control (AGC), and so on.

For example, the audio data processing system can use the synthetic audio datasets to train and test a denoising model. The denoising model can be deployed to individual client computing devices to denoise the audio signals recorded at a participant's client computing devices before transmitting to other participants of the meeting. In another example, the audio data processing system can train and test an ASR model using the synthetic audio datasets and deploy the model to a chat and video conference provider. The chat and video conference provider can use the model to generate transcripts or a summary of the meeting. The models or algorithms trained or tested using the synthetic audio datasets can be used in various other applications.

As described herein, certain embodiments provide improvements to audio processing, machine learning, and videoconferencing. Audio processing algorithms and machine learning models for audio signals require a large amount of training data to train the models or test the algorithms in order to achieve high accuracy. However, obtaining audio datasets is time-consuming and the obtained datasets may be inaccurate, leading to high computational consumption and low accuracy of the trained machine learning models or tested algorithms. The technologies presented herein solve the problem by recording a set of basis audio signals from which synthetic audio signals can be generated for an infinite number of virtual meeting room scenarios. Because the set of basis audio signals can be recorded in a controlled environment to prevent interference during the recording, the set of basis audio signals have high quality, thereby reducing the time and computations required in the post-processing of these audio signals. The time and computation spent generating the synthetic audio signals for a given meeting room setup are negligible compared to those spent recording the audio signals under the given meeting room setup. As a result, a large amount of training data can be generated with significantly less time and computations and of high accuracy. This leads to the high accuracy and high efficiency of training or testing the machine learning models or algorithms for audio signal processing. Consequently, videoconferencing can be improved by providing high-quality audio signal and accurate transcripts and meeting summary.

This illustrative example is given to introduce the reader to the general subject matter discussed herein and the disclosure is not limited to this example. The following sections describe various additional non-limiting examples and examples of systems and methods for active speaker detection for videoconferencing.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
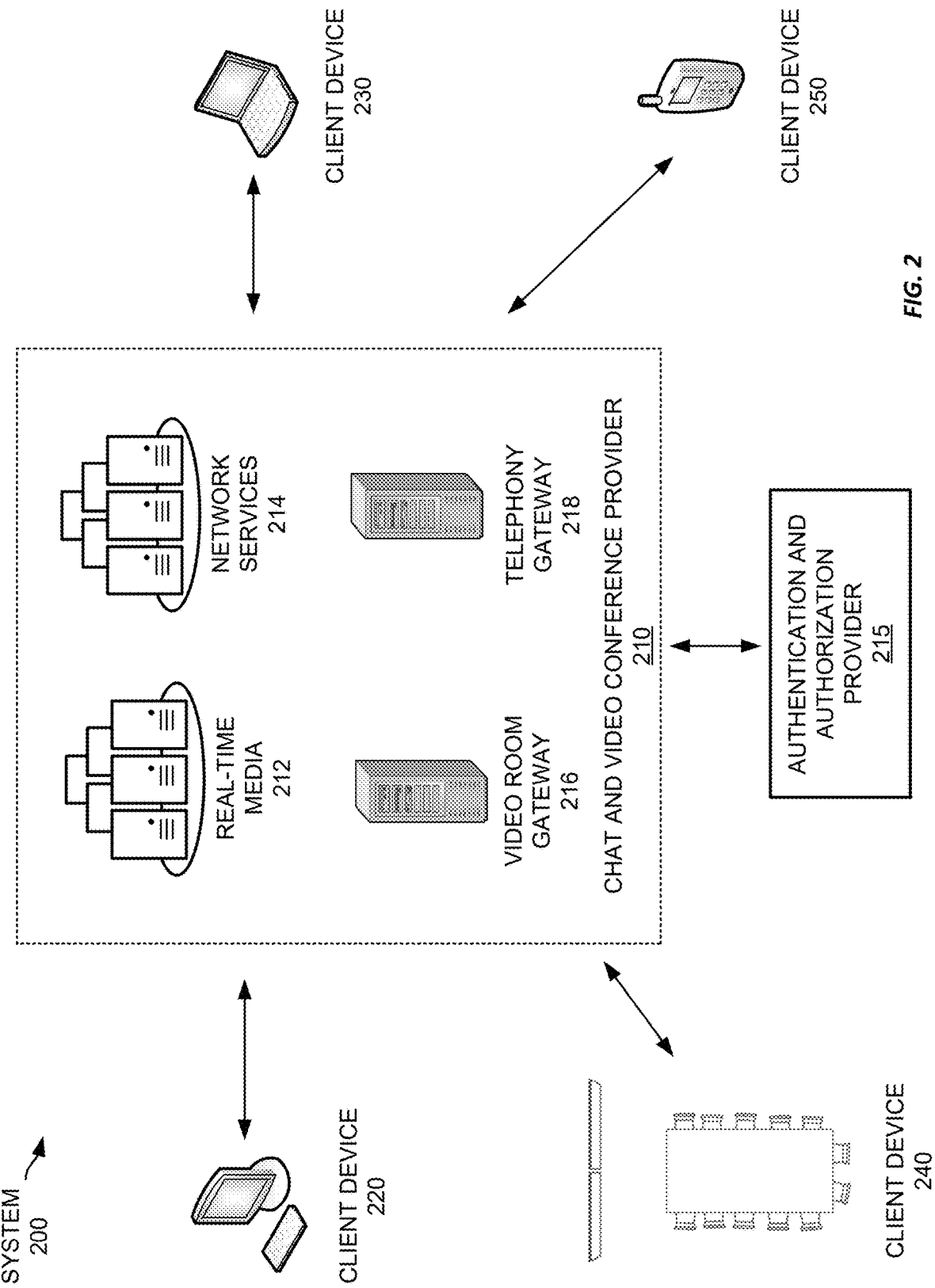
FIG. 2 shows an example system in which a chat and video conference provider provides videoconferencing functionality to various client devices, according to certain aspects described herein.

Chat and video conference provider 110 allows clients to create videoconference meetings (or "meetings") and invite others to participate in those meetings as well as perform other related functionality, such as recording the meetings, generating speech transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employ a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example, encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryptions may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory, and network I/O as well as network parameters such as packet loss, latency, and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples, additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-

250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information, etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
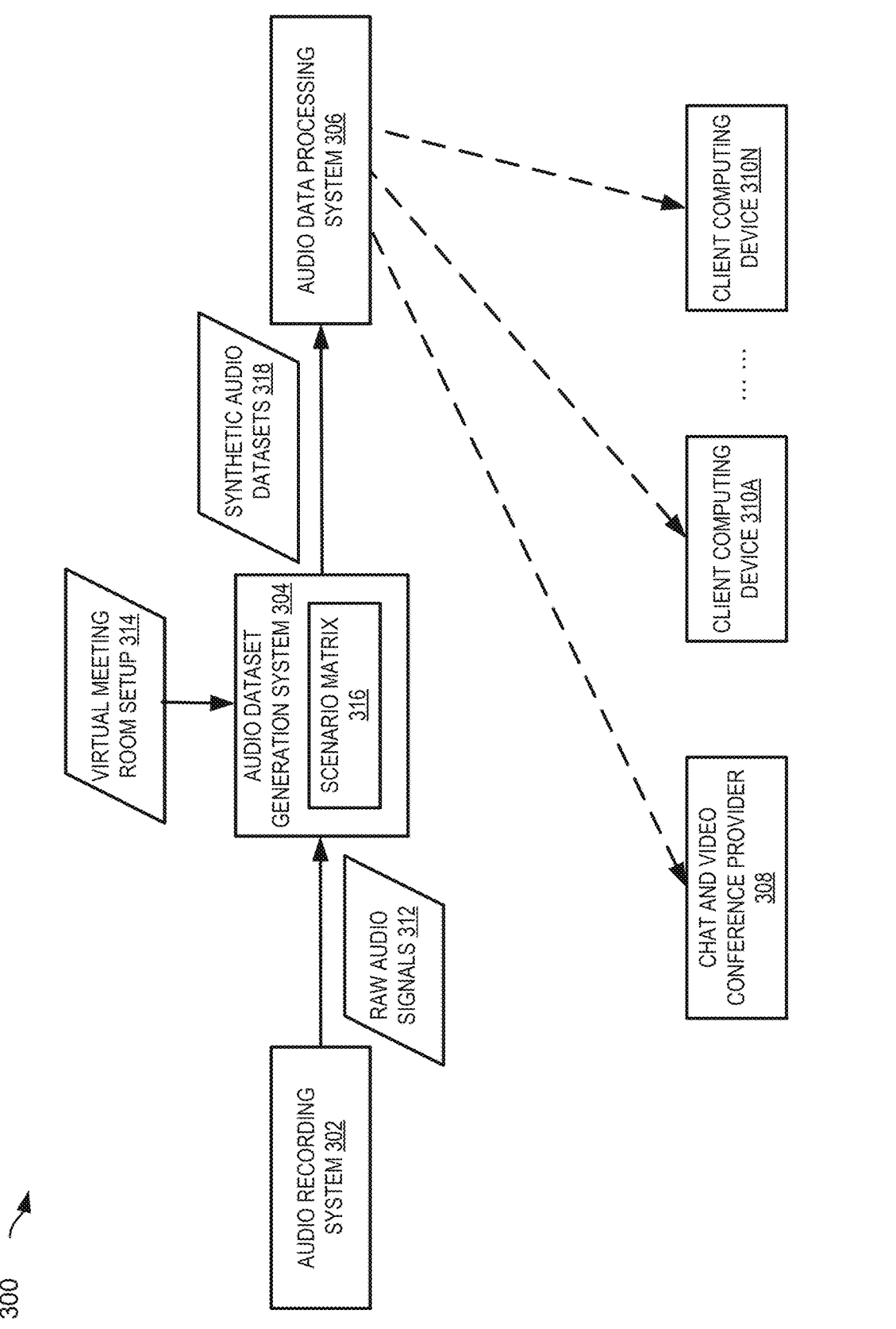
FIG. 3 shows an example of an operating environment for audio dataset generation for videoconferencing, according to certain aspects of the present disclosure.

Referring now to FIG. 3, FIG. 3 shows an example of an operating environment 300 for audio dataset generation for videoconferencing, according to certain aspects described herein. The operating environment 300 includes an audio recording system 302 configured to record raw audio signals 312 in a controlled environment. In some examples, the audio recording system 302 uses an audio source device to play source audio files and records raw audio signals using different types of microphones. The recording can be performed with different distances and orientations between the microphones and the audio source device. The recorded audio files include the raw audio signals 312 that can be used to generate synthetic audio datasets 318. Additional details regarding the audio recording system 302 will be described later with respect to FIGS. 4-6.

The operating environment 300 further includes an audio dataset generation system 304 configured to generate synthetic audio datasets 318 based on a virtual meeting room setup 314. In some examples, the audio dataset generation system 304 generates a scenario matrix 316 based on the virtual meeting room setup 314 to describe the distance and orientation relationship between each microphone and speaker in the virtual room specified by the virtual meeting room setup 314. Based on the scenario matrix 316, the audio dataset generation system 304 can select corresponding segments from the raw audio signals 312. The selected segments can be combined to generate synthetic audio datasets 318 along with other information. Additional details regarding the audio dataset generation system 304 will be described later with respect to FIGS. 7-9.

The operating environment 300 further includes an audio data processing system 306. The audio data processing system 306 can be a system configured to train, test, or evaluate audio processing machine learning models or algorithms used in, for example, sound event detection (SED), automatic speech recognition (ASR), denoising, acoustic echo cancellation (AEC), automatic gain control (AGC), and so on. For example, the audio data processing system 306 can use the synthetic audio datasets 318 to train and test a denoising model. The denoising model can be deployed to individual client computing devices 310A-310N (such as the client computing devices 140-170 in FIG. 1 and the client devices 220-250 in FIG. 2) to denoise the audio signals recorded at a participant's client computing devices before transmitting to other participants of the meeting. In another example, the audio data processing system 306 can train and test an ASR model using the synthetic audio datasets 318 and deploy the model to a chat and video conference provider 308 (such as the chat and video conference provider 110 and 210 in FIGS. 1 and 2, respectively). The chat and video conference provider 308 can use the model to generate transcripts or a summary of the meeting. The models or algorithms trained or tested using the synthetic audio datasets can be used in various other applications.

Figure 4:
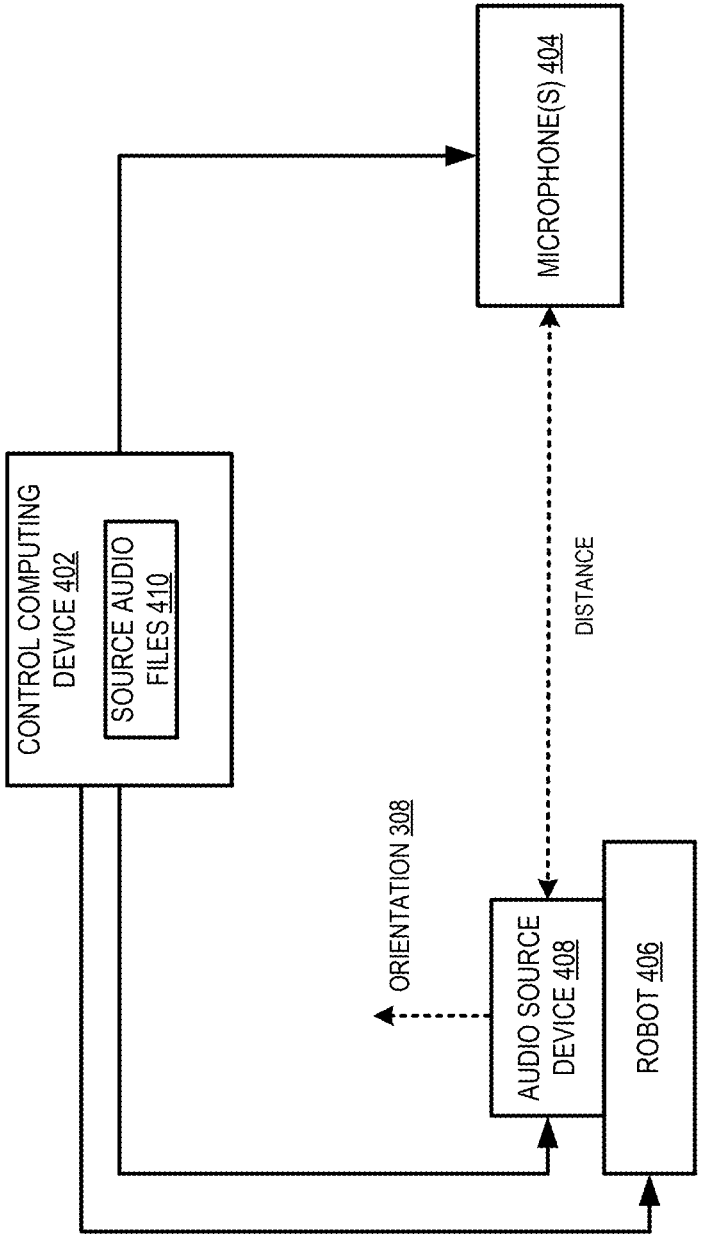
FIG. 4 shows a block diagram illustrating an example of an audio recording system, according to certain aspects of the present disclosure.

Referring now to FIG. 4, FIG. 4 shows a block diagram illustrating an example of an audio recording system 400, according to certain aspects of the present disclosure. The audio recording system 400 can be used as the audio recording system 302 shown in FIG. 3. As shown in FIG. 4, the audio recording system 400 includes a control computing device 402, a set of microphones 404, an audio source device 408, and a robot 406. The set of microphones 404 can be arranged in a close distance to each other (e.g., no more than 1 meter away). The set of microphones can include different types of microphones that may be used during the video conference, such as a laptop microphone, a standalone microphone, a conference microphone used in a conferencing system, table microphone, ceiling microphone, microphone array, and so on. The audio source device 408 can be a head speaker configured to simulate the human vocal characteristic where the volume of the played audio reduces as the propagation distance increases in a way similar to human voices. The audio source device 408 can be installed on the robot 406 or another programmable moving device that can move to different distances and orientations.

Figure 5:
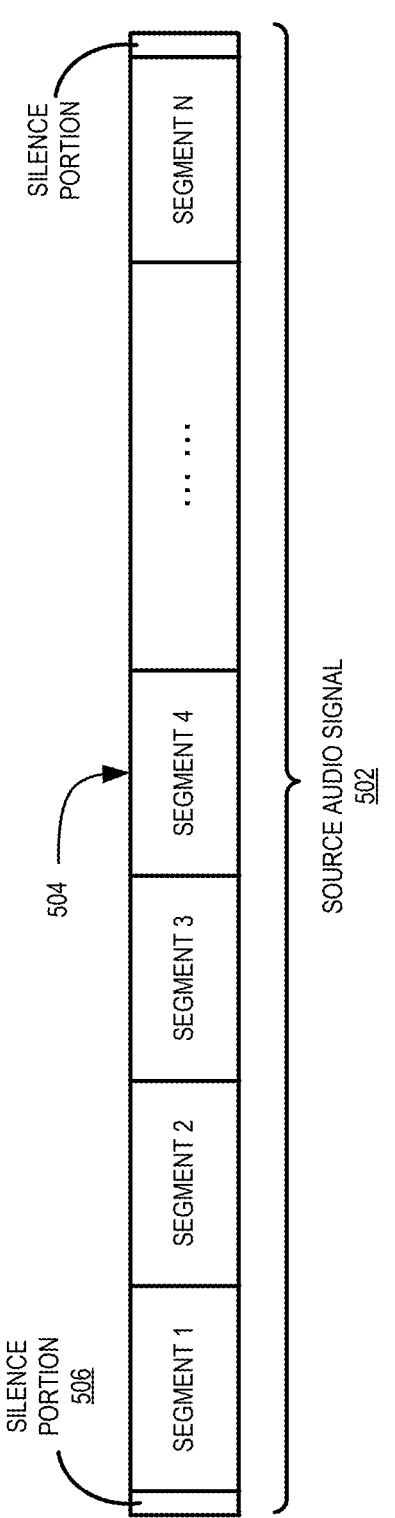
FIG. 5 shows an example of the source audio signal used to record audio signals for videoconferencing, according to certain aspects of the present disclosure.

In some examples, the microphones 404, the audio source device 408, and the robot 406 are controlled by the control computing device 402. To record audio signals, the control computing device 402 can access a set of source audio files 410, each file containing a source audio signal of human speeches or conversations. In some implementations, the source audio files contain high quality audio signals, such as audio signals with large frequency range, high signal to noise ratio (SNR), no reverberation, and so on. Further, unwanted gaps can be removed from the source audio signals, whereas silence periods can be added before and after the materials (e.g., 1 second) to avoid loss of data due to hardware delay. In addition, instead of a single long source audio file, multiple short files can be used to avoid package loss (e.g., some portion of the audio signal is not recorded by the microphones) that could be caused by hardware, software, or the control computing device. For example, each source audio file can be set to be one minute long. Each source audio signal can contain multiple segments with each segment corresponding to one sentence. FIG. 5 shows an example of the source audio signal 502. The source audio signal 502 includes multiple segments 504, each segment containing the audio signal of one sentence. The segments in the source audio signal 502 may constitute a conversation between two or more persons or a speech by a single person. The source audio signal 502 also includes a silence portion 506 at the beginning and/or the end of the signal.

Package loss may also be caused by software used for the recording. To reduce this kind of package losses, the files can be directly sent to or received from the I/O of the source audio device or microphones. For example, WASAPI on Windows® and Coreaudio framework on MAC® which are the lowest level application programming interface (API) to communicate with hardware can be used. The system can be further configured to record and play audio data for each short time period (e.g., 10 milliseconds) so as to minimize the delay.

In some examples, for each source audio file, the control computing device 402 turns on the microphones 404 and plays the source audio file 410 on the audio source device 408 at a given distance and orientation with respect to the microphones 404. Once the playing of the source audio file 410 is over, the control computing device 402 stores the recorded raw audio signals as individual files, one for each microphone. The control computing device 402 can then move the robot 406 to a different orientation from the microphones and repeat the above process until the set of source audio files 410 have been recorded at the given distance for all the predetermined set of orientations. The control computing device 402 can then move the robot 406 to a different distance and repeat the above process again. As a result, the source audio file 410 can be recorded by the microphones 404 at different distances and orientations from the audio source device 408. Each of the recorded files can be stored for later use.

The distance measures how far away the audio source device 408 is from the microphones 404. In some examples, the control computing device 402 can control the robot 406 (thereby the audio source device 408) to perform the recordings at a predetermined set of distances, such as 0.5 meter, 1 meter, 1.5 meter, 2 meters, and so on. The orientation measures the relative angle between the front of the audio source device 408 and the microphones 404. In the example of FIG. 4, the front of the audio source device 408 is facing north, and thus the orientation of the audio source device 408 relative to the microphones 404 is 90 degrees. The recording can be performed for a predetermined set of orientations, such as 0 degree, 90 degrees, 180 degrees, and 270 degrees.

In some implementations, the predetermined set of distances and the predetermined set of orientations as well as other settings are specified in a configuration file. Below shows an example of the configuration file:

```
{
    "inputPath": "/Users/username/Documents/audiofile",
    "outputPath": "/Users/username/Documents/audiofile/
        out",
    "speaker": "Plantronics Blackwire 5220 Series",
    "Devices": {
        "Recording device": ["BlackHole 2ch", "Loopback
            Audio 6", "Loopback Audio 64", "MacBook Pro
            Microphone", "Plantronics Blackwire 5220
            Series" ]
    }
    "distances": [0.5, 1, 1.5, 2, 3, 4, 5]
    "orientations": [0, 90, 180, 270]
}
```

In this example, the configuration file specifies the file path for retrieving the source audio files and the file path for outputting the recorded files. The configuration file further specifies the microphones selected for recording. This allows the audio recording system 400 to flexibly select a subset of the microphones 404 to be used to generate the raw audio files. The configuration further specifies the set of distances and orientations to be used for the recording.

Figure 6:
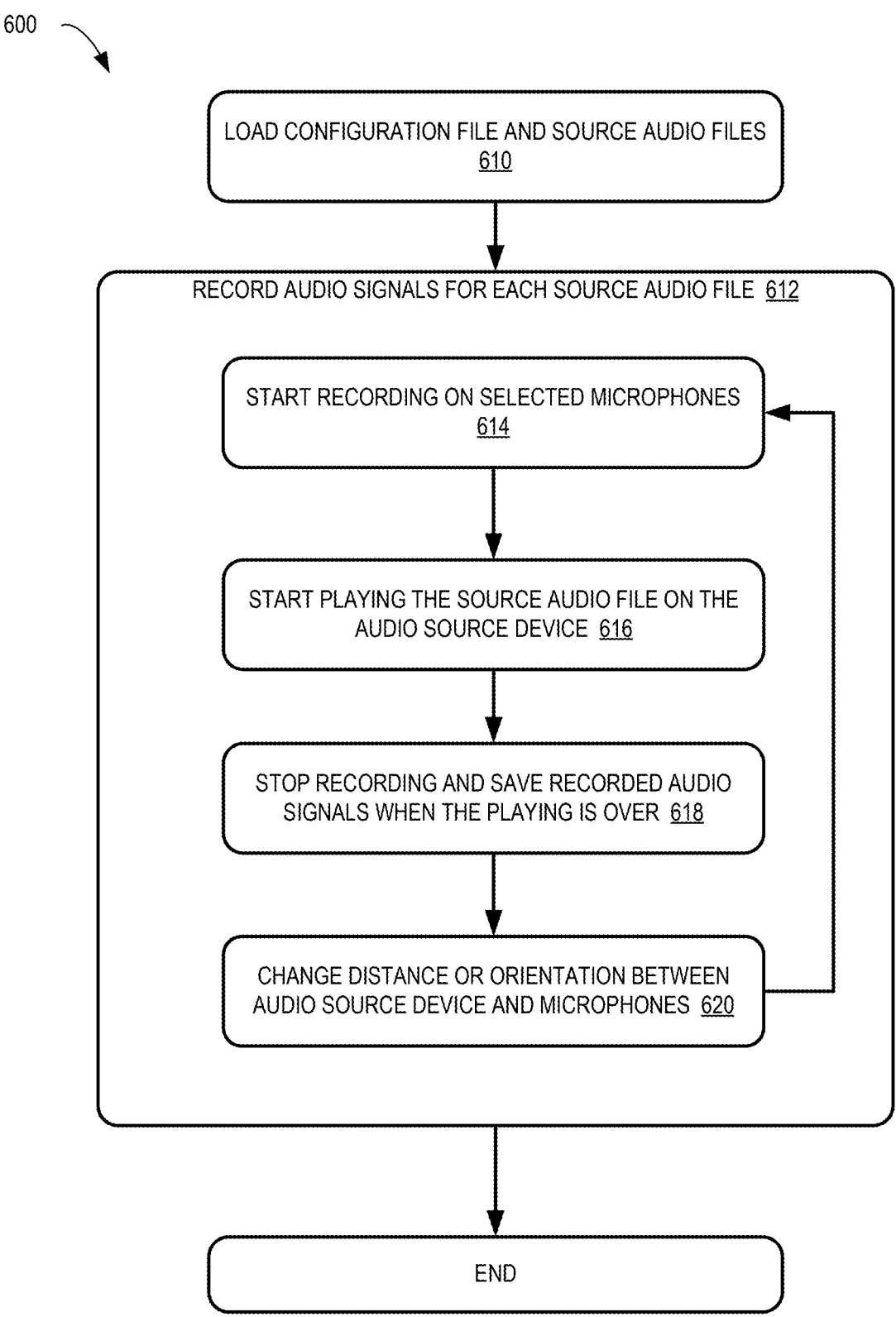
FIG. 6 shows a flowchart depicting a process for generating recorded raw audio signals, according to certain aspects of the present disclosure.

FIG. 6 shows a flowchart depicting a process 600 for generating recorded raw audio signals, according to certain aspects of the present disclosure. The control computing device 402 can be configured to implement operations depicted in FIG. 6 by executing suitable program code. The software or program code may be stored on a non-transitory storage medium (e.g., on a memory device). The process depicted in FIG. 6 and described below is intended to be illustrative and non-limiting. Although FIG. 6 depicts the various processing blocks occurring in a particular sequence or order, this is not intended to be limiting. In certain alternative embodiments, the blocks may be performed in some different order, or some blocks may also be performed in parallel. For illustrative purposes, the process 600 is described with reference to certain examples depicted in the figures. Other implementations, however, are possible.

At block 610, the process 600 involves loading a configuration file. As discussed above, based on the configuration file, the control computing device 402 can determine the input file path for accessing the source audio files, the microphones to be turned on, the output file path for storing the recorded files, and so on.

At block 612, which includes blocks 614-620, the process 600 involves recording audio signals for each of the source audio files. At block 614, the control computing device 402 starts the recording on the microphones that are specified by the configuration file. For example, the control computing device 402 can turn on the specified microphones while keeping the remaining microphones off. At block 616, the control computing device 402 starts playing the source audio file on the audio source device 408. Note that before playing the source audio file, the audio source device 408 has been moved to a distance and orientation as specified by the configuration file.

At block 618, the control computing device 402 determines whether the playing of the source audio file is over. If so, the control computing device 402 stops the recording on the selected microphones and saves the recorded audio signals into files on the output file path as specified in the configuration file. In some implementations, the configuration information such as the microphone type, the distance and orientation, the audio source file name or identifier is stored in the corresponding recorded audio file, such as in the file name or in the metadata.

At block 620, the control computing device 402 controls the robot 406 to move the audio source device 408 to a next distance and orientation combination as specified in the configuration file. The blocks 614-618 are then repeated to generate raw audio signals for the new distance and orientation combination. The generated raw audio signals 312 can be used to generate the synthetic audio datasets 318.

Figure 7:
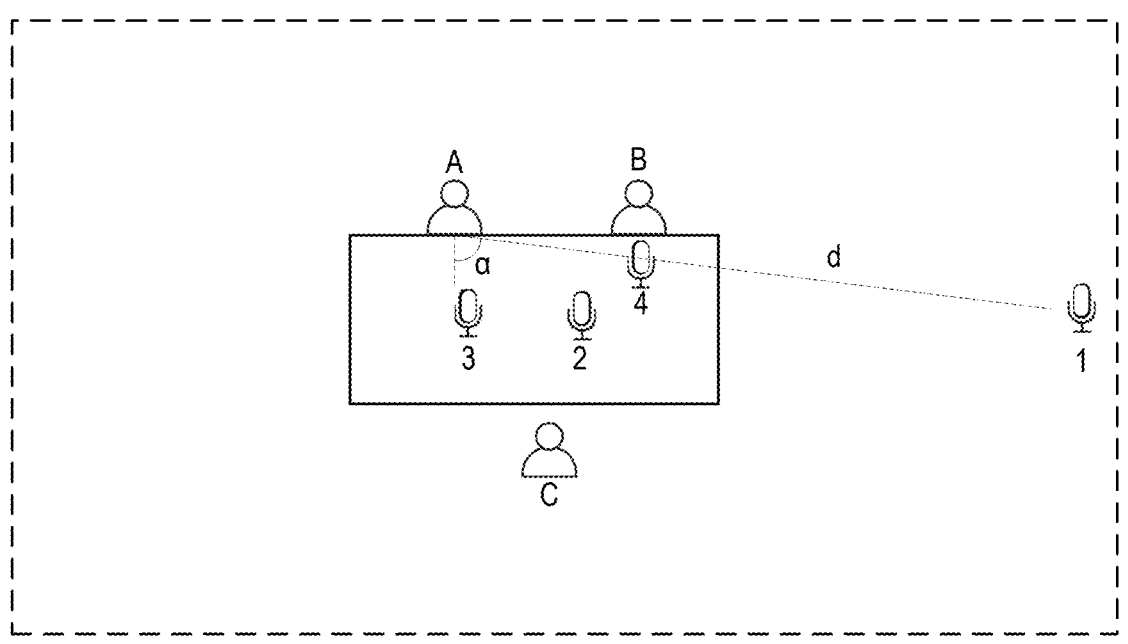
FIG. 7 shows an example of a virtual meeting room setup and the corresponding scenario matrix that can be used to generate synthetic audio datasets, according to certain aspects of the present disclosure.

FIG. 7 shows an example of a virtual meeting room setup 702 and the corresponding scenario matrix 704 that can be used to generate synthetic audio datasets, according to certain aspects of the present disclosure. The virtual meeting room setup 702 specifies that there are three speakers A, B, C in the virtual meeting room sitting on both sides of a conference table. There are also four microphones, microphone 1 is a microphone of the TV mounted on the wall; microphones 2 and 3 are conference microphones placed on the table; and microphone 4 is an integrated microphone of a laptop in front of speaker B.

The virtual meeting room setup 702 further specifies the locations of the three speakers and four microphones within the conference room, such as by specifying their respective coordinates. Based on the location information, the control computing device 402 can determine the distance d between each pair of speaker and microphone and their orientation a. The distance d, the orientation a (in terms of angle), and microphone type can be organized into the scenario matrix 704. In the example shown in FIG. 7, each row of the scenario matrix 704 represents a microphone, and each column represents a speaker. In each element $(m_i, d_{j\_i}, \alpha_{j\_i})$, $m_i$ indicates that the type of microphone i; $d_{j\_i}$ represents the distance between speaker j and microphone i; $\alpha_{j\_i}$ represents the orientation of speaker j face direction relative to microphone i.

Figure 8:
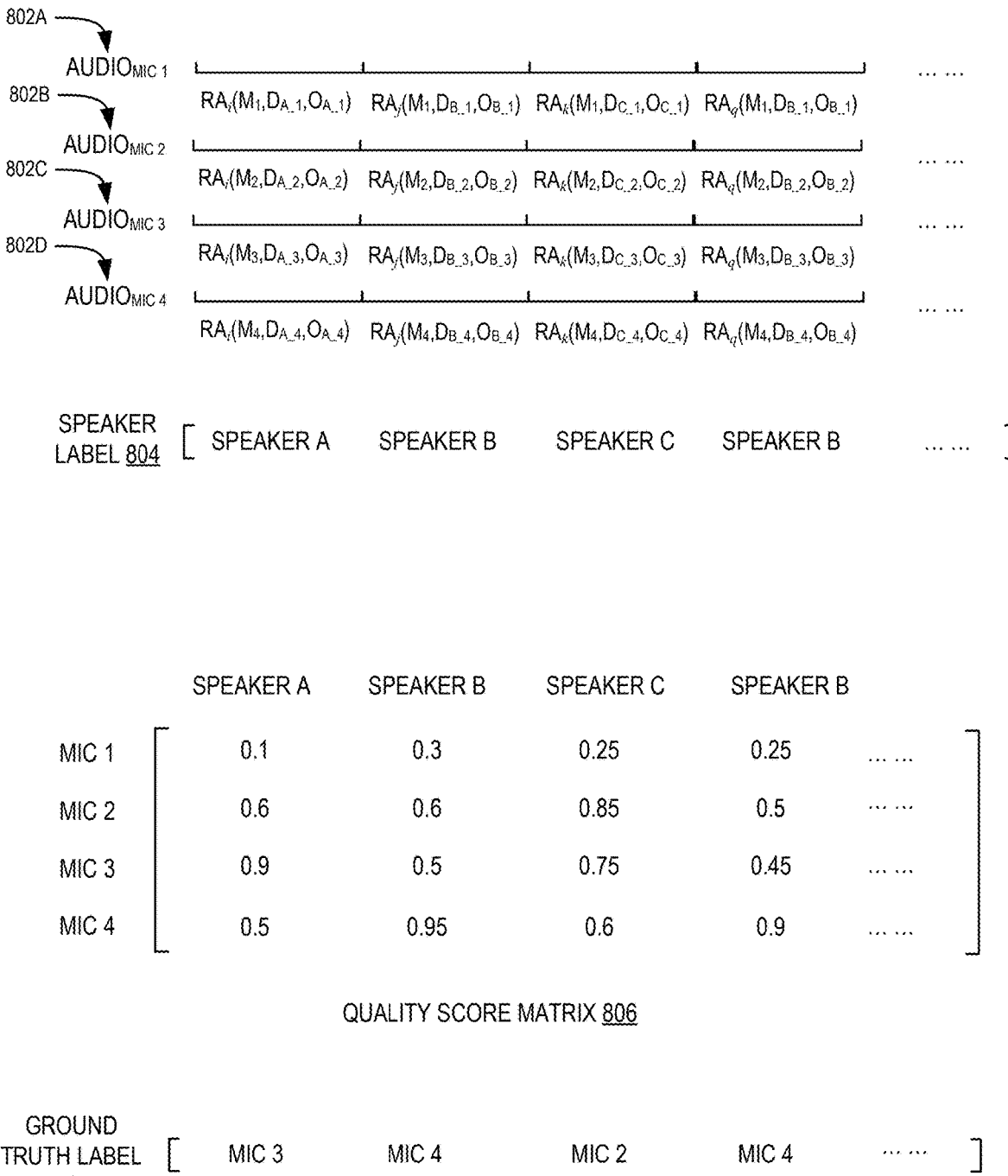
FIG. 8 shows examples of the generated synthetic audio dataset for a virtual meeting room setup, according to certain aspects of the present disclosure.

Based on the scenario matrix 704, the audio recording system 302 can generate synthetic audio datasets for the virtual meeting room setup 702. FIG. 8 shows examples of the generated synthetic audio dataset for the virtual meeting room setup 702. The synthetic audio dataset includes the synthetic audio signals 802A-802D generated for the four microphones, respectively. The four synthetic audio signals 802A-802D are generated for the speaking order specified in the active speaker label 804. For example, audio signal 802A for microphone 1 can include multiple segments $RA_i(M_1, D_{A\_1}, O_{A\_1})$, $RA_j(M_1, D_{B\_1}, O_{B\_1})$, $RA_k(M_1, D_{C\_1}, O_{C\_1})$, $RA_q(M_1, D_{B\_1}, O_{B\_1})$, . . . extracted from the recorded raw audio signals. Here, $M_1$ is the type of the microphone used to record the segment $RA_i(M_1, D_{A\_1}, O_{A\_1})$ and $M_1$ should be the same or a similar type as $m_1$ specified in the scenario matrix 704. $D_{A\_1}$ is the recording distance of the segment $RA_i(M_1, D_{A\_1}, O_{A\_1})$, and $O_{A\_1}$ is the recording orientation of the segment $RA_i(M_1, D_{A\_1}, O_{A\_1})$. $D_{A\_1}$ is closer to $d_{A\_1}$ than other recording distances. In other words, $D_{A\_1}$ can be determined by rounding $d_{A\_1}$ to the closest recording distance. Likewise, $O_{A\_1}$ is closer to $\alpha_{4\_1}$ than other recording orientations and can be determined by rounding $\alpha_{4\_1}$ to the closest recording orientation. Based on the determined $M_1$, $D_{A\_1}$, $O_{A\_1}$, the audio file containing the recorded audio signal for $M_1$ microphone at distance $D_{A\_1}$ and orientation $O_{A\_1}$ can be retrieved. The i-th segment of the recorded raw audio signal can be used as $RA_i(M_1, D_{A\_1}, O_{A\_1})$ to construct the synthetic audio signal $Audio_{MIC\_1}$ 802A that corresponds to a sentence spoken by speaker A. Similarly, the second segment $RA_1(M_1, D_{B\_1}, O_{B\_1})$ can be extracted as the j-th segment of the raw audio signal recorded using microphone $M_1$ at distance $D_{B\_1}$ and orientation $O_{B\_1}$; the third segment $RA_k(M_1, D_{C\_1}, O_{C\_1})$ can be extracted as the k-th segment of the raw audio signal recorded using microphone $M_1$ at distance $D_{C\_1}$ and orientation $O_{C\_1}$; the fourth segment $RA_q(M_1, D_{B\_1}, O_{B\_1})$ can be extracted as the q-th segment of the raw audio signal recorded using microphone $M_1$ at distance $D_{B\_1}$ and orientation $O_{B\_1}$, and so on. Here, i, j, k and q are different to avoid the same segment to be used multiple times in one synthetic audio signal. In some examples, the audio signal 802A is generated to have the same length as a recorded audio signal. The other three synthetic audio signals 802B-802D can be similarly generated.

As discussed above, the audio dataset generation system 304 can determine the quality of raw audio signals, for example, by generating a quality score for each segment of each raw audio signal. For example, mean opinion score (MOS), perceptual objective listening quality analysis (POLQA), perceptual evaluation of speech quality (PESQ), virtual speech quality objective listener (ViSQOL) can be used to determine the quality score for each segment of the raw audio signal. The quality score of each raw audio signal can also be determined, for example, by determining the average quality score of the segments in the audio signal. If the quality scores are available, the audio dataset generation system can generate a score matrix indicating the quality of the audio signal from a specific speaker as recorded by a particular microphone. FIG. 8 further shows an example of the quality score matrix 806. Each quality score in the quality score matrix 806 indicates the audio quality of the corresponding segment in the synthetic audio signals 802A-802D. For example, the first segment in $Audio_{MIC\ 1}$ 802A has a quality score 0.1; the first segment in $Audio_{MIC\ 2}$ 802B has a quality score 0.6; the first segment in $Audio_{MIC\ 3}$ 802C has a quality score 0.9; the first segment in $Audio_{MIC\ 4}$ 802D has a quality score 0.5. As such, the audio captured by microphone 3 has the best quality. Such information is indicated in a ground truth label 808. Based on the ground truth label, the microphone that captures the audio signals having the highest quality for each speaker can be identified. The synthetic audio signals 802A-802D, the active speaker labels 804, and the ground truth label 808, if available, can be output as the synthetic audio datasets.

FIG. 9 shows a flowchart depicting a process 900 for generating synthetic audio datasets, according to certain aspects of the present disclosure. The audio dataset generation system 304 can be configured to implement operations depicted in FIG. 9 by executing suitable program code. The software or program code may be stored on a non-transitory storage medium (e.g., on a memory device). The process depicted in FIG. 9 and described below is intended to be illustrative and non-limiting. Although FIG. 9 depicts the various processing blocks occurring in a particular sequence or order, this is not intended to be limiting. In certain alternative embodiments, the blocks may be performed in some different order, or some blocks may also be performed in parallel. For illustrative purposes, the process 900 is described with reference to certain examples depicted in the figures. Other implementations, however, are possible.

At block 910, the process 900 involves pre-processing the raw audio signals recorded by the audio recording system 302. As discussed above, the audio dataset generation system 304 may process the raw audio signals by removing the silent portions in the raw audio signals and aligning the raw audio signals temporally. The pre-processing may also include resampling the raw audio signals to a higher or lower frequency and removing other unnecessary parts. In some examples, the pre-processing may further include calculating the quality scores for the segments of the raw audio signals as discussed above. In other examples, the quality scores may be calculated by another computing device.

At block 912, the process 900 involves accessing a virtual meeting room setup that describes the locations of individual microphones and speakers in a virtual meeting room. If the quality scores of the raw audio signals are available, the audio dataset generation system 304 can further access the quality scores of the raw audio signals that are calculated by the audio dataset generation system 304 or another computing device. At block 914, the process 900 involves constructing a scenario matrix from the virtual meeting room setup. For example, each element of the scenario matrix can specify the type of a microphone used to record a speaker, the distance and the orientation between the microphone and the speaker as discussed above in detail with respect to FIG. 8.

At block 916, the process 900 involves constructing synthetic audio signals by extracting segments from the raw audio signals based on the scenario matrix. If the raw audio signals have been pre-processed, the extraction is performed on the pre-processed raw audio signals. For each element in the scenario matrix, the audio dataset generation system 304 can identify the recording distance and recording orientation that are closest to the distance and orientation specified in the scenario matrix element. The audio dataset generation system 304 can further select the segment in the raw audio signal that corresponds to the determined recording distance and orientation as well as the microphone type. The extracted segments can be combined, such as by concatenating according to a predetermined speaker order to generate the synthetic audio recorded by each microphone in the virtual meeting room. In addition, an active speaker label can also be generated for each segment of the synthetic audio signals to indicate the speaker who was actively speaking during that segment.

At block 918, the process 900 involves generating an audio quality score matrix and the ground truth labels. This block is performed if the audio quality scores for the raw audio signals are available. As discussed above with respect to FIG. 8, the audio quality score matrix includes elements each indicating the quality score for a corresponding segment of a corresponding microphone. For each segment, the microphone having the highest score is indicated in ground truth labels. At block 920, the generated data such as the synthetic audio signals, the active speaker labels, and the ground truth labels can be output as the synthetic audio dataset for the virtual meeting room setup. The process 900, such as blocks 912-920, can be repeated for other virtual meeting room setups.

Figure 10:
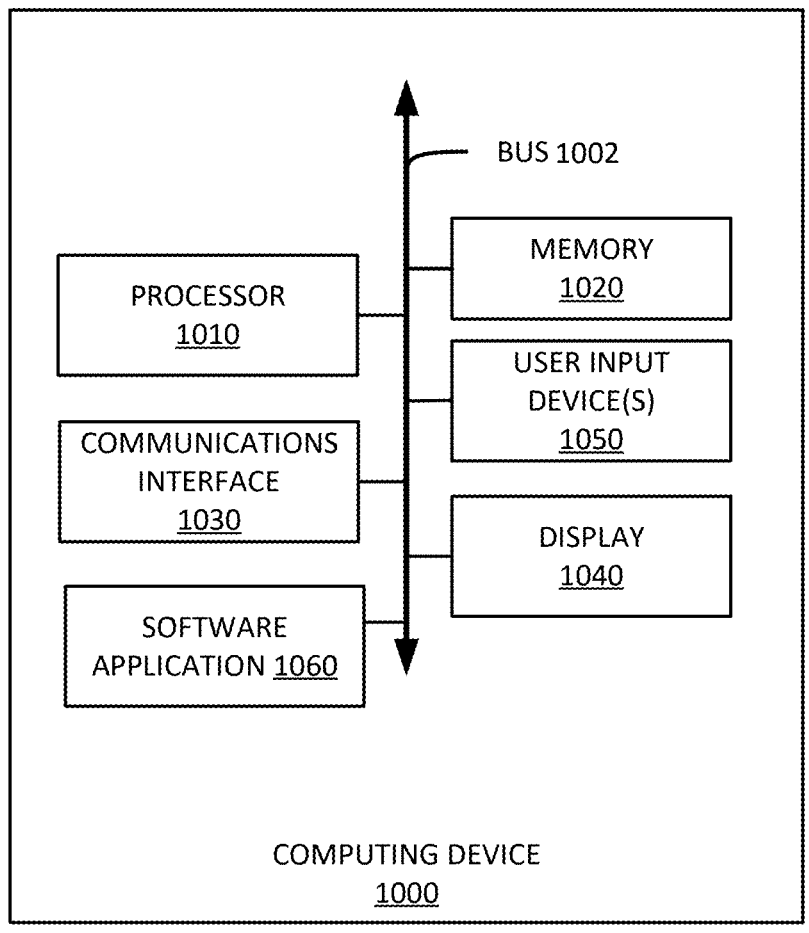
FIG. 10 shows an example computing device suitable for performing certain aspects of the present disclosure.

Referring now to FIG. 10, FIG. 10 shows an example computing device 1000 suitable for performing certain aspects of the present disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more processes described herein, such as part or all of the example process 600 described above with respect to FIG. 6 or part or all of the example process 900 described above with respect to FIG. 9. For example, the software application 1060 provided on the computing device 1000 may provide instructions for performing one or more steps of the process 600 or 900. The computing device, in this example, also includes one or more user input devices 1050, such as a keyboard, mouse, touchscreen, video input device (e.g., one or more cameras), microphone, etc., to accept user input. The computing device 1000 also includes a display 1040 to provide visual output to a user.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example #1: a method for generating a synthetic audio signal, the method comprising: recording, by an audio recording system, a set of raw audio signals, the set of raw audio signals comprising audio signals recorded by a plurality of microphones at a plurality of distances from an audio source with a plurality of orientations; accessing, by an audio dataset generation system, a virtual meeting room setup, the virtual meeting room setup specifying microphones used in a virtual meeting room, locations of speakers and the microphones, and orientations of the speakers; and generating, by the audio dataset generation system, a synthetic audio signal for each of the speakers specified in the virtual meeting room setup by combining audio signals selected from the set of raw audio signals according to the virtual meeting room setup.

Example #2: the method of Example #1, wherein recording the set of raw audio signals comprises: controlling the audio source to move to a first distance from the plurality of microphones; controlling the audio source to face to a first orientation of the plurality of orientations; recording audio signals played on the audio source using the plurality of microphones to generate a first subset of raw audio signals of the set of raw audio signals corresponding to the first distance and the first orientation; controlling the audio source to have a second orientation; recording audio signals played on the audio source using the plurality of microphones to generate a second subset of raw audio signals of the set of raw audio signals corresponding to the first distance and the second orientation; controlling the audio source to move to a second distance from the plurality of microphones; controlling the audio source to have the first orientation; recording audio signals played on the audio source using the plurality of microphones to generate a third subset of raw audio signals of the set of raw audio signals corresponding to the second distance and the first orientation; controlling the audio source to have the second orientation; and recording audio signals played on the audio source using the plurality of microphones to generate a second subset of raw audio signals of the set of raw audio signals corresponding to the second distance and the second orientation.

Example #3: the method of Examples #1-2, wherein the audio source is a head speaker, and the plurality of orientations comprises a 0-degree orientation, a 90-degree orientation, a 180-degree orientation, and a 270-degree orientation.

Example #4: the method of Examples #1-3, wherein generating the synthetic audio signal comprises: constructing, according to the virtual meeting room setup, a scenario matrix describing relationships between each of the speakers and each of the microphones; extracting audio signals from the set of raw audio signals based on the scenario matrix; and combining the extracted audio signals to generate respective synthetic audio signals for the microphones.

Example #5: the method of Examples #1-4, wherein the relationships between each of the speakers and each of the microphones comprise a distance between the speaker and the microphone and an orientation of the speaker relative to the microphone.

Example #6: the method of Examples #1-5, wherein generating the synthetic audio signal further comprises: generating a quality score matrix for the extracted audio signals, each value in the quality score matrix indicating a quality of a corresponding extracted audio signal that corresponds to a specific speaker as recorded by a particular microphone; generating ground truth labels for the speakers based on the quality score matrix identifying a highest-quality microphone for each speaker; and generating active speaker labels indicating active speakers of respective segments of the synthetic audio signal.

Example #7: the method of Examples #1-6, further comprising pre-processing the set of raw audio signals by at least: removing a silent portion of each of the set of raw audio signals; and aligning the set of raw audio signals.

Example #8: the method of Examples #1-7, wherein each audio signal in the set of raw audio signals comprise human speeches.

Example #9: the method of Examples #1-8, further comprising causing the synthetic audio signal to be used as training data or testing data for an audio processing model.

Example #10: a system comprising: an audio recording system, comprising: a plurality of microphones; an audio source; and a computing device configured to: record a set of raw audio signals, the set of raw audio signals comprising audio signals recorded by a plurality of microphones at a plurality of distances from an audio source with a plurality of orientations; and an audio dataset generation system, comprising: a non-transitory computer-readable medium; and a processor communicatively coupled to the non-transitory computer-readable medium, the processor configured to execute processor-executable instructions stored in the non-transitory computer-readable medium to: access a virtual meeting room setup, the virtual meeting room setup specifying microphones used in a virtual meeting room, locations of speakers and the microphones, and orientations of the speakers; and generate a synthetic audio signal for each of the speakers specified in the virtual meeting room setup by combining audio signals selected from the set of raw audio signals according to the virtual meeting room setup.

Example #11: the system of Example #10, wherein recording the set of raw audio signals comprises: controlling the audio source to move to a first distance from the plurality of microphones; controlling the audio source to face to a first orientation of the plurality of orientations; recording audio signals played on the audio source using the plurality of microphones to generate a first subset of raw audio signals of the set of raw audio signals corresponding to the first distance and the first orientation; controlling the audio source to have a second orientation; recording audio signals played on the audio source using the plurality of microphones to generate a second subset of raw audio signals of the set of raw audio signals corresponding to the first distance and the second orientation; controlling the audio source to move to a second distance from the plurality of microphones; controlling the audio source to have the first orientation; recording audio signals played on the audio source using the plurality of microphones to generate a third subset of raw audio signals of the set of raw audio signals corresponding to the second distance and the first orientation; controlling the audio source to have the second orientation; and recording audio signals played on the audio source using the plurality of microphones to generate a second subset of raw audio signals of the set of raw audio signals corresponding to the second distance and the second orientation.

Example #12: the system of Examples #10-11, wherein generating the synthetic audio signal comprises: constructing, according to the virtual meeting room setup, a scenario matrix describing relationships between each of the speakers and each of the microphones; extracting audio signals from the set of raw audio signals based on the scenario matrix; and combining the extracted audio signals to generate respective synthetic audio signals for the microphones.

Example #13: the system of Examples #10-12, wherein the relationships between each of the speakers and each of the microphones comprise a distance between the speaker and the microphone and an orientation of the speaker relative to the microphone.

Example #14: the system of Examples #10-13, wherein generating the synthetic audio signal further comprises: generating a quality score matrix for the extracted audio signals, each value in the quality score matrix indicating a quality of a corresponding extracted audio signal that corresponds to a specific speaker as recorded by a particular microphone; generating ground truth labels for the speakers based on the quality score matrix identifying a highest-quality microphone for each speaker; and generating active speaker labels indicating active speakers of respective segments of the synthetic audio signal.

Example #15: the system of Examples #10-14, wherein the processor is further configured to execute processor-executable instructions stored in the non-transitory computer-readable medium to pre-process the set of raw audio signals by at least: removing a silent portion of each of the set of raw audio signals; and aligning the set of raw audio signals.

Example #16: a non-transitory computer-readable medium comprising processor-executable instructions configured to cause one or more processors to: access a virtual meeting room setup, the virtual meeting room setup specifying microphones used in a virtual meeting room, locations of speakers and the microphones, and orientations of the speakers; and generate a synthetic audio signal for each of the speakers specified in the virtual meeting room setup by combining audio signals selected from a set of raw audio signals according to the virtual meeting room setup, wherein the set of raw audio signals comprise audio signals recorded by a plurality of microphones at a plurality of distances from an audio source with a plurality of orientations.

Example #17: the non-transitory computer-readable medium of Example #16, wherein recording the set of raw audio signals comprises: controlling the audio source to move to a first distance from the plurality of microphones; controlling the audio source to face to a first orientation of the plurality of orientations; recording audio signals played on the audio source using the plurality of microphones to generate a first subset of raw audio signals of the set of raw audio signals corresponding to the first distance and the first orientation; controlling the audio source to have a second orientation; recording audio signals played on the audio source using the plurality of microphones to generate a second subset of raw audio signals of the set of raw audio signals corresponding to the first distance and the second orientation; controlling the audio source to move to a second distance from the plurality of microphones; controlling the audio source to have the first orientation; recording audio signals played on the audio source using the plurality of microphones to generate a third subset of raw audio signals of the set of raw audio signals corresponding to the second distance and the first orientation; controlling the audio source to have the second orientation; and recording audio signals played on the audio source using the plurality of microphones to generate a second subset of raw audio signals of the set of raw audio signals corresponding to the second distance and the second orientation.

Example #18: the non-transitory computer-readable medium of Examples #16-17, wherein generating the synthetic audio signal comprises: constructing, according to the virtual meeting room setup, a scenario matrix describing relationships between each of the speakers and each of the microphones; extracting audio signals from the set of raw audio signals based on the scenario matrix; and combining the extracted audio signals to generate respective synthetic audio signals for the microphones.

Example #19: the non-transitory computer-readable medium of Examples #16-18, wherein the relationships between each of the speakers and each of the microphones comprise a distance between the speaker and the microphone and an orientation of the speaker relative to the microphone.

Example #20: the non-transitory computer-readable medium of Examples #16-19, wherein generating the synthetic audio signal further comprises: generating a quality score matrix for the extracted audio signals, each value in the quality score matrix indicating a quality of a corresponding extracted audio signal that corresponds to a specific speaker as recorded by a particular microphone; generating ground truth labels for the speakers based on the quality score matrix identifying a highest-quality microphone for each speaker; and generating active speaker labels indicating active speakers of respective segments of the synthetic audio signal.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method for generating a synthetic audio signal, the method comprising:
   recording, by an audio recording system, a set of raw audio signals, the set of raw audio signals comprising audio signals recorded by a plurality of microphones at a plurality of distances from an audio source with a plurality of orientations;
   accessing, by an audio dataset generation system, a virtual meeting room setup, the virtual meeting room setup specifying microphones used in a virtual meeting room, locations of speakers and the microphones, and orientations of the speakers; and generating, by the audio dataset generation system, a synthetic audio signal for each of the speakers specified in the virtual meeting room setup comprising combining audio signals selected from the set of raw audio signals according to the virtual meeting room setup.

2. The method of claim 1, wherein recording the set of raw audio signals comprises:
   controlling the audio source to move to a first distance from the plurality of microphones;
   controlling the audio source to face to a first orientation of the plurality of orientations;
   recording audio signals played on the audio source using the plurality of microphones to generate a first subset of raw audio signals of the set of raw audio signals corresponding to the first distance and the first orientation;
   controlling the audio source to have a second orientation;
   recording audio signals played on the audio source using the plurality of microphones to generate a second subset of raw audio signals of the set of raw audio signals corresponding to the first distance and the second orientation;
   controlling the audio source to move to a second distance from the plurality of microphones;
   controlling the audio source to have the first orientation;
   recording audio signals played on the audio source using the plurality of microphones to generate a third subset of raw audio signals of the set of raw audio signals corresponding to the second distance and the first orientation;
   controlling the audio source to have the second orientation; and
   recording audio signals played on the audio source using the plurality of microphones to generate a second subset of raw audio signals of the set of raw audio signals corresponding to the second distance and the second orientation.

3. The method of claim 2, wherein the audio source is a head speaker, and the plurality of orientations comprises a 0-degree orientation, a 90-degree orientation, a 180-degree orientation, and a 270-degree orientation.

4. The method of claim 1, wherein generating the synthetic audio signal comprises:
   constructing, according to the virtual meeting room setup, a scenario matrix describing relationships between each of the speakers and each of the microphones;
   extracting audio signals from the set of raw audio signals based on the scenario matrix; and
   combining the extracted audio signals to generate respective synthetic audio signals for the microphones.

5. The method of claim 4, wherein the relationships between each of the speakers and each of the microphones comprise a distance between the speaker and the microphone and an orientation of the speaker relative to the microphone.

6. The method of claim 4, wherein generating the synthetic audio signal further comprises:
   generating a quality score matrix for the extracted audio signals, each value in the quality score matrix indicating a quality of a corresponding extracted audio signal that corresponds to a specific speaker as recorded by a particular microphone;
   generating ground truth labels for the speakers based on the quality score matrix identifying a highest-quality microphone for each speaker; and
   generating active speaker labels indicating active speakers of respective segments of the synthetic audio signal.

7. The method of claim 1, further comprising pre-processing the set of raw audio signals by at least:

removing a silent portion of each of the set of raw audio signals; and aligning the set of raw audio signals.

8. The method of claim 1, wherein each audio signal in the set of raw audio signals comprise human speeches.

9. The method of claim 1, further comprising causing the synthetic audio signal to be used as training data or testing data for an audio processing model.

10. A system comprising:

an audio recording system, comprising:

a plurality of microphones;

an audio source; and a computing device configured to:

record a set of raw audio signals, the set of raw audio signals comprising audio signals recorded by a plurality of microphones at a plurality of distances from an audio source with a plurality of orientations; and an audio dataset generation system, comprising:

a non-transitory computer-readable medium; and a processor communicatively coupled to the non-transitory computer-readable medium, the processor configured to execute processor-executable instructions stored in the non-transitory computer-readable medium to:

access a virtual meeting room setup, the virtual meeting room setup specifying microphones used in a virtual meeting room, locations of speakers and the microphones, and orientations of the speakers; and generate a synthetic audio signal for each of the speakers specified in the virtual meeting room setup comprising combining audio signals selected from the set of raw audio signals according to the virtual meeting room setup.

11. The system of claim 10, wherein recording the set of raw audio signals comprises:

controlling the audio source to move to a first distance from the plurality of microphones;

controlling the audio source to face to a first orientation of the plurality of orientations;

recording audio signals played on the audio source using the plurality of microphones to generate a first subset of raw audio signals of the set of raw audio signals corresponding to the first distance and the first orientation;

controlling the audio source to have a second orientation;

recording audio signals played on the audio source using the plurality of microphones to generate a second subset of raw audio signals of the set of raw audio signals corresponding to the first distance and the second orientation;

controlling the audio source to move to a second distance from the plurality of microphones;

controlling the audio source to have the first orientation;

recording audio signals played on the audio source using the plurality of microphones to generate a third subset of raw audio signals of the set of raw audio signals corresponding to the second distance and the first orientation;

controlling the audio source to have the second orientation; and recording audio signals played on the audio source using the plurality of microphones to generate a second subset of raw audio signals of the set of raw audio signals corresponding to the second distance and the second orientation.

12. The system of claim 10, wherein generating the synthetic audio signal comprises:

constructing, according to the virtual meeting room setup, a scenario matrix describing relationships between each of the speakers and each of the microphones;

extracting audio signals from the set of raw audio signals based on the scenario matrix; and combining the extracted audio signals to generate respective synthetic audio signals for the microphones.

13. The system of claim 12, wherein the relationships between each of the speakers and each of the microphones comprise a distance between the speaker and the microphone and an orientation of the speaker relative to the microphone.

14. The system of claim 12, wherein generating the synthetic audio signal further comprises:

generating a quality score matrix for the extracted audio signals, each value in the quality score matrix indicating a quality of a corresponding extracted audio signal that corresponds to a specific speaker as recorded by a particular microphone;

generating ground truth labels for the speakers based on the quality score matrix identifying a highest-quality microphone for each speaker; and generating active speaker labels indicating active speakers of respective segments of the synthetic audio signal.

15. The system of claim 10, wherein the processor is further configured to execute processor-executable instructions stored in the non-transitory computer-readable medium to pre-process the set of raw audio signals by at least:

removing a silent portion of each of the set of raw audio signals; and aligning the set of raw audio signals.

16. A non-transitory computer-readable medium comprising processor-executable instructions configured to cause one or more processors to:

access a virtual meeting room setup, the virtual meeting room setup specifying microphones used in a virtual meeting room, locations of speakers and the microphones, and orientations of the speakers; and generate a synthetic audio signal for each of the speakers specified in the virtual meeting room setup comprising combining audio signals selected from a set of raw audio signals according to the virtual meeting room setup, wherein the set of raw audio signals comprise audio signals recorded by a plurality of microphones at a plurality of distances from an audio source with a plurality of orientations.

17. The non-transitory computer-readable medium of claim 16, wherein recording the set of raw audio signals comprises:

controlling the audio source to move to a first distance from the plurality of microphones;

controlling the audio source to face to a first orientation of the plurality of orientations;

recording audio signals played on the audio source using the plurality of microphones to generate a first subset of raw audio signals of the set of raw audio signals corresponding to the first distance and the first orientation;

controlling the audio source to have a second orientation;

recording audio signals played on the audio source using the plurality of microphones to generate a second subset of raw audio signals of the set of raw audio signals corresponding to the first distance and the second orientation;

controlling the audio source to move to a second distance from the plurality of microphones;

controlling the audio source to have the first orientation;

recording audio signals played on the audio source using the plurality of microphones to generate a third subset of raw audio signals of the set of raw audio signals corresponding to the second distance and the first orientation;

controlling the audio source to have the second orientation; and recording audio signals played on the audio source using the plurality of microphones to generate a second subset of raw audio signals of the set of raw audio signals corresponding to the second distance and the second orientation.

18. The non-transitory computer-readable medium of claim 16, wherein generating the synthetic audio signal comprises:

constructing, according to the virtual meeting room setup, a scenario matrix describing relationships between each of the speakers and each of the microphones;

extracting audio signals from the set of raw audio signals based on the scenario matrix; and combining the extracted audio signals to generate respective synthetic audio signals for the microphones.

19. The non-transitory computer-readable medium of claim 18, wherein the relationships between each of the speakers and each of the microphones comprise a distance between the speaker and the microphone and an orientation of the speaker relative to the microphone.

20. The non-transitory computer-readable medium of claim 18, wherein generating the synthetic audio signal further comprises:

generating a quality score matrix for the extracted audio signals, each value in the quality score matrix indicating a quality of a corresponding extracted audio signal that corresponds to a specific speaker as recorded by a particular microphone;

generating ground truth labels for the speakers based on the quality score matrix identifying a highest-quality microphone for each speaker; and generating active speaker labels indicating active speakers of respective segments of the synthetic audio signal.

\* \* \* \* \*